United States Patent
Jania

[15] 3,679,270
[45] July 25, 1972

[54] SKID CONTROL APPARATUS FOR VEHICLE BRAKE SYSTEM

[72] Inventor: Zbigniew J. Jania, Northville, Mich.
[73] Assignee: Ford Motor Company, Dearborn, Mich.
[22] Filed: June 15, 1970
[21] Appl. No.: 46,076

[52] U.S. Cl. ..................303/21 F, 303/10, 188/181 A
[51] Int. Cl. ......................................................B60t 8/02
[58] Field of Search ..............................303/21, 24, 61–63, 303/68–69, 10, 6, 2; 188/181

[56] References Cited

UNITED STATES PATENTS

| | | | |
|---|---|---|---|
| 3,521,934 | 7/1970 | Leiber | 303/21 F |
| 3,524,684 | 8/1970 | Skoyles | 303/21 F |
| 3,549,211 | 12/1970 | Leiber | 303/21 F |
| 3,325,226 | 6/1967 | Perrino | 303/21 F |

Primary Examiner—Milton Buchler
Assistant Examiner—John J. McLaughlin
Attorney—John R. Faulkner and Robert W. Brown

[57] ABSTRACT

A brake system having a master cylinder and a slave cylinder connected to the master cylinder for actuating a wheel braking device is equipped with skid control apparatus. Means are provided for applying a first axial force to one side of the piston in the master cylinder. A skid control actuating means is connected to the master cylinder to provide a second axial force to the piston in opposition to the first axial force. The second axial force exerted by the skid control actuator means on the master cylinder piston is dependent upon the fluid output pressure from a skid control valve means, the output from the skid control valve means being the input to the skid control actuator means. The pressure level of the output from the skid control valve means is dependent upon the magnitude of an input signal supplied to the valve means. Power assist means are described which reduce the effort required to be expended by the vehicle operator to actuate the braking system.

8 Claims, 3 Drawing Figures

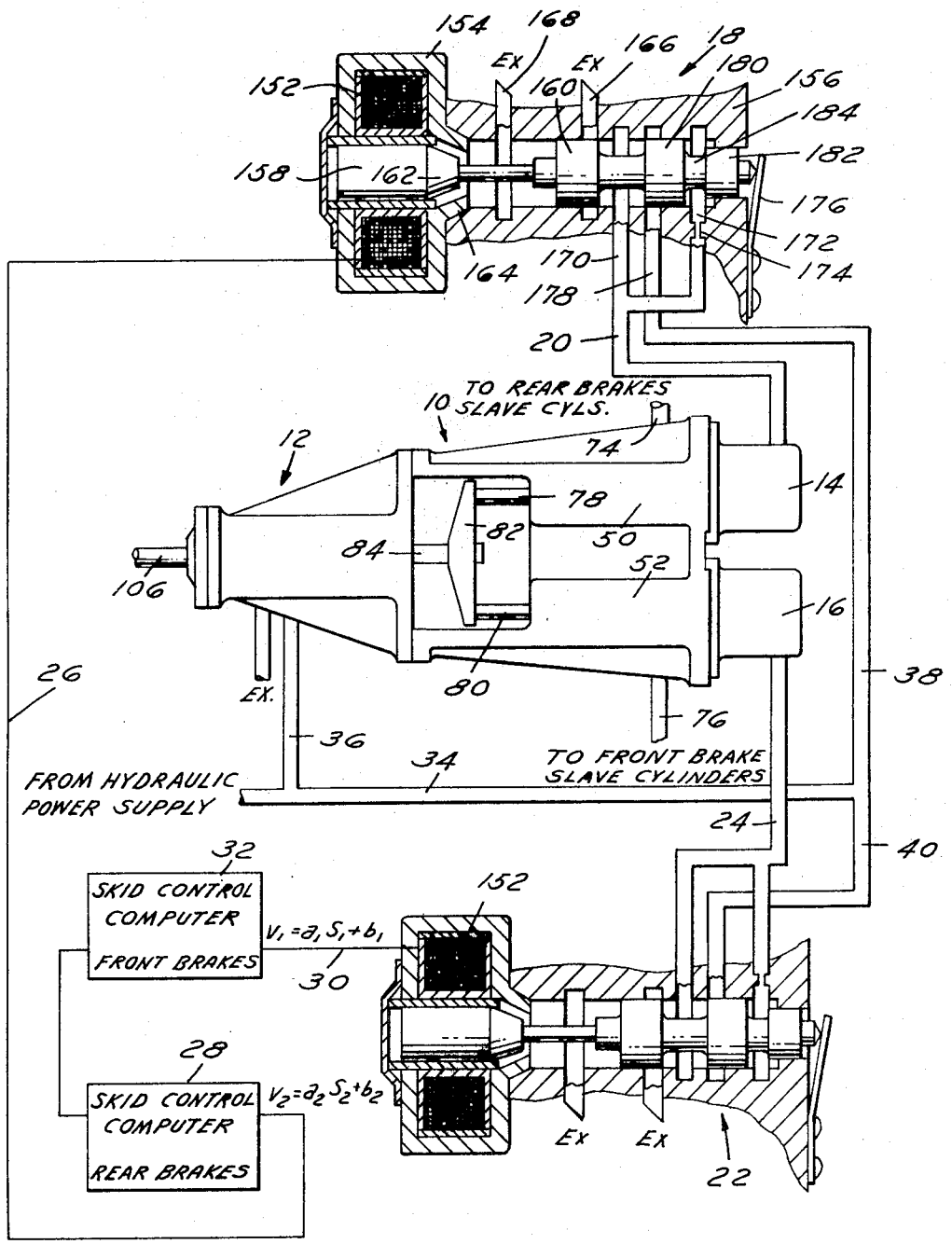

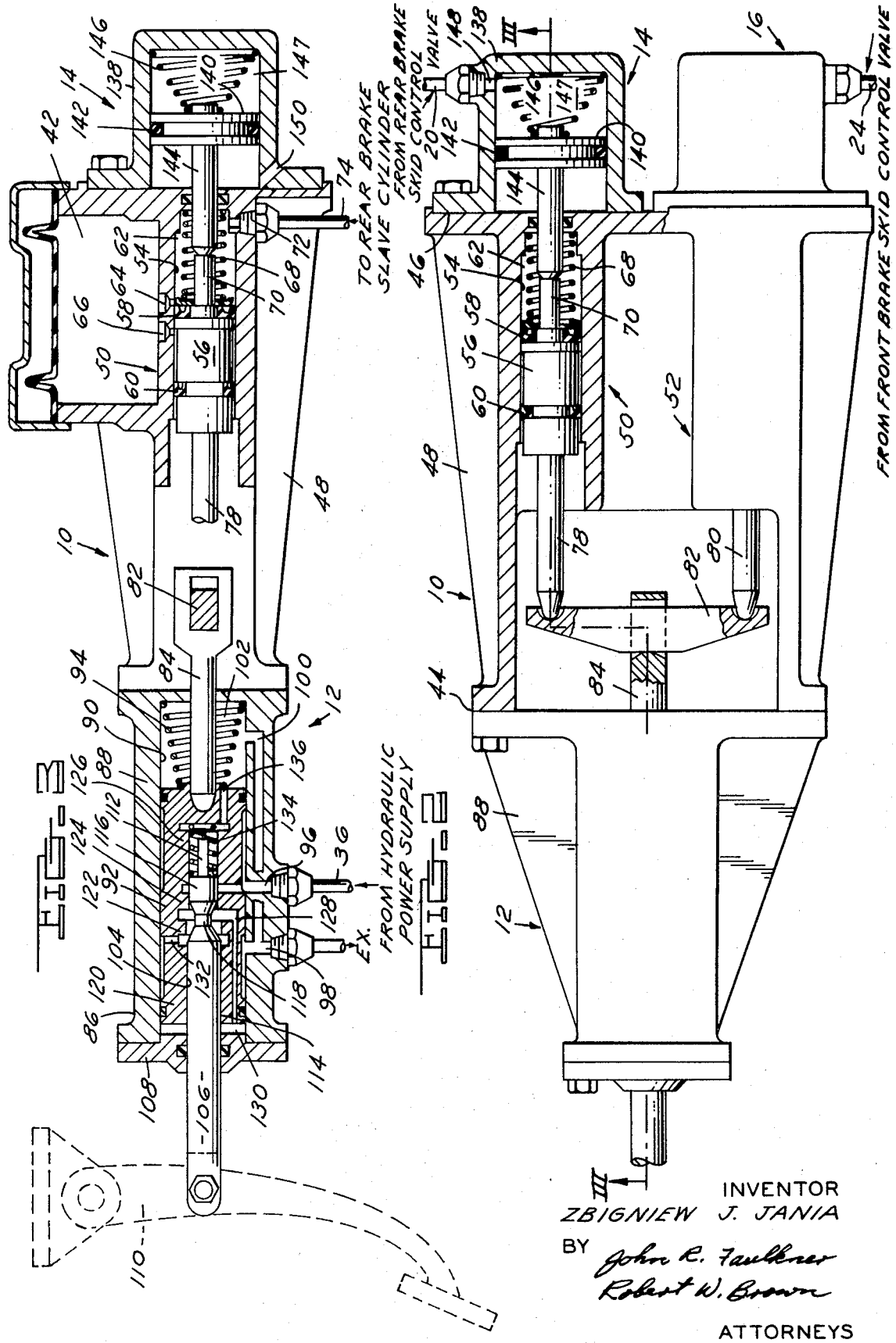

SKID CONTROL APPARATUS FOR VEHICLE BRAKE SYSTEM

BACKGROUND OF THE INVENTION

The present invention relates to skid control apparatus for use in a vehicle braking system. More particularly, the present invention relates to skid control apparatus for use in conjunction with a master cylinder that supplies fluid pressure to a slave cylinder which, in turn, actuates a wheel brake mechanism. The invention is primarily intended for application to four-wheeled motor vehicles, but it may be advantageously applied to other types of vehicles as well.

The vast majority of motor vehicles in use today are equipped with some type of friction brake at each of their wheels. The brake mechanism typically is actuated by a slave cylinder supplied with fluid pressure from a master cylinder. The brake mechanism may be of the drum type, in which a set of brake shoes is radially expanded against the brake drum, or a disc brake system may be employed, in which the slave cylinder actuates a caliper device to frictionally engage a disc that rotates with the wheel.

When the brake of a moving vehicle is applied, the deceleration rate of that vehicle ultimately depends upon the frictional force generated by the vehicle tire in contact with the road surface. This frictional force acts in opposition to the vehicle velocity and causes a deceleration of the vehicle. The magnitude of this frictional force generated by the tire in contact with the road surface, in turn, depends in a nonlinear manner upon the frictional force exerted on the rotating wheel by the frictionally engaged brake mechanism, which tends to reduce the rotational velocity of the wheel.

If the frictional force exerted by the brake mechanism on the vehicle wheels is sufficiently large, the wheel will cease to rotate and a skid condition will result. This is known as wheel lock. When this condition occurs, there is a loss of vehicle control and steering response. Also, the most efficient braking condition, from the standpoint of shortest stopping distance, occurs when the wheels are rotating with a certain amount of slip between the road surface and the vehicle's tires.

Although wheel slip may be defined in various ways, for the purposes of the present invention disclosure, vehicle wheel slip S is defined as the ratio of the difference between vehicle velocity $V_c$ and brake wheel velocity $V_w$ to vehicle velocity $V_c$, or, slip S equals $(V_c - V_w)$ divided by $V_c$. Slip S may be expressed as a percentage by multiplication of the above ratio by 100 percent. From this definition, it may be seen that the wheel slip S is equal to zero when the wheel velocity $V_w$ is equal to the vehicle velocity $V_c$. Also, it may be seen that the slip S is equal to 100 percent when the wheel velocity $V_w$ is equal to zero, such as occurs in a wheel lock situation. It has been generally recognized that the maximum coefficient of friction between the vehicle tires and the road surface, and, hence, that the most effective braking, can be realized when the wheel slip S is within the range of from about 10 to 20 percent.

Because the most efficient braking takes place when the fluid pressure in the brake system is less than the maximum pressure obtainable in the system, it is desirable to provide some means for limiting the pressure in the brake system to prevent the occurrence of a wheel lock condition and resultant skidding of the vehicle.

Numerous systems designed to prevent the occurrence of a wheel lock and skid condition, or designed to eliminate this condition once it has occurred, has been proposed. A high percentage of the skid control systems previously proposed and presently in use on motor vehicles have utilized the technique of providing a device for sensing an excessive wheel slip condition, such as an inertial switch which indicates an excessive deceleration rate for the vehicle wheels, the sensing device actuating a mechanism which cuts off pressure from the master cylinder to the brake system slave cylinder and which then provides for volumetric expansion within the brake line to reduce the brake pressure to thereby eliminate the excessive wheel slip condition. Somewhat similar mechanisms have been devised wherein a device responsive to an excessive wheel deceleration is used to actuate a value mechanism which relieves the brake pressure and which may, at the same time, apply a second predetermined pressure against the brake mechanism to reduce the braking pressure. This type of skid control may be accomplished with either a vacuum power assist system or with a hydraulic system. Moreover, actuation of the device responsive to excessive wheel deceleration may be used to initiate operation of a cycling pressure application system to reduce, in a modulating manner, effective braking pressure to prevent excessive wheel slip. An example of a skid control system wherein two predetermined pressure levels are used to achieve skid control may be seen in U.S. Pat. No. 3,401,986 issued Sept. 17, 1968, to F. J. Walker and W. H. Bent.

Another type of prior art skid control system may be seen in U.S. Pat. No. 3,404,923 issued Oct. 8, 1968, to Robert Smoren. In this system, depression of a brake pedal closes a switch which actuates a timed relay. The relay continuously switches on and off to alternately actuate a solenoid plunger mechanism which applies pressure against the pedal pressure applied by the vehicle operator to the master cylinder. Thus, the cyclical action of the solenoid valve plunger continuously relieves the brake pressure as applies to the pedal by the operator, and it thereby prevents the wheels from becoming locked.

SUMMARY OF THE INVENTION

In accordance with the invention, a fluid operated vehicle braking system has incorporated therein skid control apparatus which is responsive to an input signal indicative of excessive wheel slip; preferably, the input signal is an electrical signal obtained from a skid control computer.

Broadly described, the skid control apparatus includes master cylinder means connected to a vehicle wheel slave cylinder which is fluid actuated. The master cylinder means is of conventional design and has included therein a piston to which a first axial force may be applied to supply pressurized brake fluid to the slave cylinder in the vehicle wheels. Skid control actuator means are provided for the purpose of applying to the piston of the master cylinder means a second axial force acting in opposition to the first axial force. This second axial force tends to reduce the pressure of the brake fluid directed to the slave cylinder. The magnitude of the second axial force acting on the master cylinder piston is determined by skid control valve means, connected to a suitable source of fluid pressure, which supplies pressurized fluid to the skid control actuator means.

An outstanding feature of the invention is that the pressure of the fluid supplied by the skid control valve means to the skid control actuator means to produce the second axial force is of a magnitude which varies in accordance with the magnitude of the input signal indicative of excessive wheel slip. Thus, when the operator of the vehicle applies the first axial force to the piston of the master cylinder means through operation of a brake pedal or the like, pressurized fluid is directed toward the vehicle brake slave cylinder. If this brake fluid pressure is too great and causes wheel slip of an undesirably large amount, an input signal indicative of this excessive slip actuates the skid control valve means to supply fluid pressure to the skid control actuator means which, in turn, supplies the second axial force, acting in opposition to the first axial force and varying as a function of the degree of wheel slip, to the piston of the master cylinder means thereby to reduce the brake pressure and reduce the amount of wheel slip.

From the above, is is apparent that the skid control apparatus of the invention is fluid operated and, therefore, must be connected to a suitable source of fluid pressure. The source of fluid pressure may be a vacuum booster system, a source of compressed air, or a hydraulic system supplied with pressurized fluid from a suitable pump or accumulator for the storage of pressurized hydraulic fluid. The fluid used in the skid control apparatus advantageously is separate from the brake fluid which is used to actuate the slave cylinders in the vehicle wheels. The reason for this is that brake fluids which are in common use are not as suitable as other hydraulic fluids for hydraulic power and control circuit applications.

In the preferred form of the invention, the first axial force applied to the piston of the master cylinder means is supplied by a hydraulic servo assembly connected to a source of hydraulic pressure, and actuated by the vehicle operator. The same source of hydraulic pressure supplies hydraulic fluid to the skid control valve means for generation, through the skid control actuator means, of the second axial force acting in opposition to the first axial force. Moreover, in the preferred form, the skid control apparatus is so designed that it always has the capability of producing a second axial force greater in magnitude than the first axial force. Both first and second axial forces are limited by the pressure available from the source of pressurized hydraulic fluid.

As stated above, the skid control valve means supplies a fluid to the skid control actuator means at a pressure level determined by the magnitude of the input signal. This input signal must be indicative of wheel slip S, but the means by which the signal is produced is not regarded as a part of the present invention. However, it is preferred that the input signal be electrical in nature and of a voltage V that is linearly related to the amount of wheel slip. Thus, it is preferred that the skid control valve means be supplied with an electrical input signal V varying in magnitude according to the following linear equation:

$V = aS + b$ where $a$ and $b$ are constants. The constant $b$ may be made equal to zero, and the voltage function may be made discontinuous for values of $S$ below zero or some other predetermined value.

It is not essential that electrical input signal be linearly related to the amount of wheel slip. Instead, the electrical input signal may constitute a voltage which is related to the difference between the vehicle velocity and the wheel velocity, which is to some extent indicative of wheel slip. Apparatus which will produce such a voltage indicative of wheel slip is described in U.S. patent application Ser. No. 1,664 filed Jan. 9, 1970, now U.S. Pat. No. 3,622,208 issued Nov. 23, 1971, for "An Analogue Circuit for Detecting Deviations from a Predetermined Percentage Wheel Slip in an Anti-Skid Brake System", this application being filed in the name of A. D. Krugler, Jr., and assigned to the Ford Motor Company. Other electrical apparatus which produces a voltage output which is proportional to the difference between wheel speed and vehicle speed is described in U.S. patent application Ser. No. 3,122 filed Jan. 15, 1970, for "Electronic Control System for Anti-skid Vehicle Brakes," this application being filed in the names of Z. J. Jania and L. J. Vanderberg, and assigned to the Ford Motor Company.

It is desirable that a brake system intended for use on a four-wheeled automotive vehicle have a dual brake system so that, in the event of failure of one portion of the brake system, the remaining portion will be capable of supplying brake pressure to insure the existence of means for stopping the motor vehicle. Moreover, it is desirable that the basic brake system now in general use remain essentially unchanged in order that skid control apparatus can be added to such basic brake system without the necessity of extensive modifications of it. The skid control apparatus of the invention meets these objectives.

BRIEF DESCRIPTION OF THE DRAWINGS

FIG. 1 is a partially schematic drawing of the preferred embodiment of skid control apparatus intended for use in a four-wheel brake system for a motor vehicle;

FIG. 2 is a partially-sectioned plan view of a portion of the brake system and skid control apparatus shown in FIG. 1; and FIG. 3 is a sectional elevational view of the apparatus shown in FIG. 2, the section of FIG. 3 being taken along the line III—III shown in FIG. 2.

DESCRIPTION OF THE PREFERRED EMBODIMENT

With reference to FIG. 1, there is shown a brake system having incorporated therein skid control apparatus constructed in accordance with the invention. Although not shown, the brake system illustrated in FIG. 1 should be understood to include front and rear wheel braking mechanisms and slave cylinders for actuating such brake mechanisms. FIG. 1 illustrates the preferred embodiment for the brake system and associated skid control apparatus as applied to a four-wheeled motor vehicle having a dual braking system. A separate braking system is included for the two front brakes and another similar system for the two rear brakes.

The brake system equipped with skid control includes a dual master cylinder, shown generally at 10, having two separate and parallel cylinder and piston assemblies and having connected thereto means 12 for supplying a first axial force to the pistons of the dual master cylinder. Attached to the opposite end of the dual master cylinder are two skid control actuator means 14 and 16. Skid control actuator means 14 is used to control the amount of slip at the rear wheels of the motor vehicle, whereas, skid control actuator means 16 is used to control the amount of wheel slip at the front wheels of the motor vehicle. Skid control valve means 18 is hydraulically connected through line 20 to skid control actuator means 14. Skid control valve means 18 provides hydraulic fluid pressure to actuator means 14 for skid control of the rear wheels of the motor vehicle. Similarly, skid control valve means 22 is hydraulically connected by line 24 to skid control actuator means 16. Skid control valve means 22 provides hydraulic fluid pressure to actuator means 16 for skid control of the front wheels of the motor vehicle.

Rear brake skid control valve means 18 is provided with an electrical input signal through conductive line 26 from a skid control computer for the rear brakes 28. Front brake skid control valve means 22 is provided with an electrical input signal through an electrically conductive line 30 from a skid control computer for the front brakes 32.

The electrical input signals to the front brake skid control valve means 18 and to the rear brake skid control valve means 22 must be indicative of excessive wheel slip. As was previously stated, this electrical input signal does not necessarily have to be linearly related to the amount of wheel slip, but it is preferable to have such signals so related. Thus, in FIG. 1, the electrical input signal to front brake skid control valve means 22 is identified as a voltage $V_1 = a_1 S_1 + b_1$, and the input voltage to rear brake skid control valve means 18 is identified as a voltage $V_2 = a_2 S_2 + b_2$, where $a_1$, $b_1$, $a_2$ and $b_2$ are constants and where $S_1$ is the amount of slip of the front wheels and where $S_2$ is the amount of slip of the rear wheels. The constants $b_1$ and $b_2$ may be equal to zero. Also, the voltage functions $V_1$ and $V_2$ may be made discontinuous and equal to zero or some other value for amounts of slip $S_1$ and $S_2$ below predetermined values. In the preferred form of the invention, the responses of the respective front and rear brake skid control valve means are variable fluid output pressures directly proportional to the magnitudes of the input signals, which are linearly related to the amounts of wheel slip of the front and rear wheels, respectively.

The brake system and associated skid control apparatus preferably is hydraulically operated and is supplied with hydraulic power from a source of pressurized hydraulic fluid which is separate from the source of brake fluid which supplies the dual master cylinder 10 and the slave cylinders which actuate the respective brake mechanisms in the front and rear wheels. As is illustrated in FIG. 1, hydraulic line 34 is connected to a hydraulic power supply which supplies pressurized hydraulic fluid to the skid control apparatus and also through line 36 to the means 12 for supplying a first axial force to the pistons of the dual master cylinder 10, the fluid pressure in line 36 being used for power-assisted operation of the front and rear brakes. Hydraulic line 34 provides pressurized hydraulic fluid through hydraulic lines 38 and 40 to rear brake skid control valve means 18 and front brake skid control valve means 22, respectively. Brake fluid is separately supplied to dual master cylinder 10 from a brake fluid reservoir 42 (FIG. 3).

Various portions of the brake system equipped with skid control are described in greater detail in the paragraphs which follow.

With particular reference to FIG. 2, there is shown a plan view of the dual master cylinder 10 having connected thereto at 44 means 12 for supplying a first axial force to the pistons of the dual master cylinder 10. Attached along plane 46 at the opposite end of the dual master cylinder 10 is the skid control actuator means 14 for the rear brakes and the skid control actuator means 16 for the front brakes.

The two cylinder and piston assemblies and the brake fluid reservoir of the dual master cylinder 10 are of conventional construction. The dual master cylinder, however, differs from the design most generally used in that the two cylinders are connected in parallel, rather than in a tandem structure as is most common. Thus, the dual master cylinder 10 comprises a housing 48 having a cylinder and piston assembly 50 for supplying brake fluid to the rear brake slave cylinders and a cylinder and piston assembly 52 for supplying brake fluid to the front brake slave cylinders. Cylinder and piston assemblies 50 and 52 are connected in parallel and are of similar design although, for reasons which are set forth below, it may be desirable to make them of different size.

Both of the cylinder and piston assemblies 50 and 52 are comprised of a cylindrical opening 54 in housing 48 and a piston assembly 56 axially movable within the cylindrical opening 54. The piston has a primary seal 58 and a secondary seal 60. A pressure chamber 62 is fluidly connected through an intake port 64 (FIG. 3) to the brake fluid reservoir 42 to thereby allow fluid from the reservoir to enter the pressure chamber. A breather port 66 is located behind the primary seal 58. The secondary seal 60 acts as a means to prevent the escape of brake fluid. Resilient means in the form of spring 68 acts on the piston assembly 56 to urge it to the left as viewed in FIG. 3. The piston assembly includes a projection 70 which extends into the pressure chamber. The pressure chamber has an output port 72 which is connected by hydraulic line 74 to the slave cylinders for the rear brakes. Similarly, the pressure chamber of cylinder and piston assembly 52 is connected by hydraulic line 76 (FIG. 1) to the slave cylinders for the front brakes.

The two piston assemblies within the dual master cylinder assembly 10 may be moved axially to the right as viewed in FIG. 2 by means of a first axial force applied to piston extensions 78 and 80 by means of a floating beam 82 connected to a rod 84.

Because the cylinder and piston assemblies of the dual master cylinder 10 are arranged in parallel rather than in tandem, the proportioning valve, normally required for motor vehicles employing front disc and rear drum brakes to deliver a higher pressure brake fluid to the front disc brakes than is delivered to the rear drum brakes, can be eliminated. This results because the two parallel master cylinders can be made to have two different diameters, thereby to produce two different values of brake system pressure, one pressure for the front brakes and a second pressure for the rear brakes. Alternatively, the floating beam 82 can be designed so that the first axial force applied to rod 84 is proportioned between piston extensions 78 and 80 in the manner desired; for example, the distance between piston extension 78 and rod 84 may be made smaller than the distance between piston extension 80 and rod 84, thereby to proportion the axial force transmitted to the pistons through piston extensions 78 and 80.

The means 12 for supplying a first axial force to the dual master cylinder 10 through rod 84 comprises a hydraulic servo assembly 86, as may best be seen in FIG. 3. The hydraulic servo assembly includes a housing 88 having a cylindrical opening 90 therein which a piston assembly 92 is axially movable. Resilient means in the form of piston return spring 94 is provided to urge the piston assembly 92 axially to the left as viewed in FIG. 3. The housing 88 has an input port 96 connected to hydraulic line 36 from the hydraulic power supply. The housing 88 also has an exhaust port 98 which communicates with the cylindrical opening 90, and which also communicates, by means of a passage 100, with a chamber 102 formed between the housing and the piston assembly.

The piston assembly 92 has a cylindrical opening 104 therein which varies in diameter to form a plurality of valve lands. A valve spool 106, which extends to the left beyond an end plate 108 attached to housing 88, is axially movable within the cylindrical opening 104 of the piston assembly 92. Means, such as a brake pedal 110, are provided for moving valve spool 106 axially to the right as viewed in FIG. 3. The valve spool has at its right end a projection 112 which limits its axial movement to the right relative to axially movable piston assembly 92.

Valve spool 106 has a large diameter portion 114 and a slightly smaller diameter portion 116 separated from the larger diameter portion by an open-center region 118. Lands 120 and 122 formed in the interior portion of piston 92 conform in diameter to the larger portion of the valve spool, while lands 124 and 126 conform in diameter to the smaller portion of the valve spool. A passage 128 is provided in piston 92 to permit fluid flow from the valve spool open-center region 118 to a hydraulic pressure chamber 130. When valve spool 106 is in the position illustrated in FIG. 3, open-center region 118 is connected to exhaust port 98 by means of passage 132. Valve spring 134 urges valve spool 106 to the left as viewed in FIG. 3 and tends to maintain it in the position shown. Hydraulic fluid which may leak into the area in which valve spring 134 is located is free to pass through passage 136 into chamber 102 and from there through passage 100 to exhaust port 98.

When the vehicle operator depresses brake pedal 110, the hydraulic servo assembly described above provides power-assisted brake actuation through the application of a first axial force to the rod 84, the force on rod 84 being transmitted through piston extensions 78 and 80 to the pistons of dual master cylinder 10. When excessive wheel slip occurs, a second oppositely directed axial force is applied to the dual master cylinder pistons through the operation of the skid control actuator means 14 and 16 for the rear and front brakes, respectively (FIGS. 2 and 3).

The skid control actuators 14 and 16 are of identical design and are comprised of a cylindrical housing 138 having a piston assembly 140 axially movable therein. The piston assembly 140 has a sealing ring 142 and an axial extension 144 which is held, by means of actuator follow-up spring 146, in contact with the projection 70 of the dual master cylinder piston assembly 56. A working chamber 147 is formed between piston assembly 142 and housing 138. Hydraulic fluid from the skid control valve means for the front and rear brakes enters the respective skid control actuator means through a port 148. Thus, pressurized hydraulic fluid from the respective skid control valves is applied to the right-hand side of the piston assembly 140 to exert a second axial force on the piston assemblies of the dual master cylinder which is oppositely directed to the force applied by the hydraulic servo assembly. Hydraulic fluid which may leak to the left-hand side of piston assembly 140 is allowed to drain through drainage port 150.

The pressurized hydraulic fluid supplied to the skid control actuator means 14 for the rear brakes is supplied by skid control valve means 18 for the rear brakes. Similarly, an identical skid control valve means 22 supplies pressurized hydraulic fluid to the skid control actuator means 16 for the front brakes. Because skid control valve means 18 and 22 are identical in design, only one need be described in detail.

The skid control valve means 18 for the rear brakes (FIG. 1) is a solenoid actuated valve. Skid control valve means 18 is comprised of a coil 152 which is surrounded by a suitable magnetic material 154 and which has attached to it a valve body 156. The coil is electrically connected by the line 26 to the output of the skid control computer for the rear brakes. Located within the coil is a solenoid plunger 158 which is connected to move a valve spool 160 axially within the valve body 156. The voltage applied to the coil 152 causes a current to flow therein which produces a force on the solenoid plunger 158 which urges it and valve spool 160 axially to the right as viewed in FIG. 1. The force on the solenoid plunger and valve spool 160 is made directly proportional to the magnitude of the current flow in the coil. This proportionality between the force on the solenoid plunger and the coil current is maintained throughout the small travel of the solenoid plunger by means of the tapered design of portion 162 of the solenoid plunger and of a corresponding portion 164 of the magnetic circuit. This tapered design principle for a solenoid coil is well known in the art of solenoid design. The valve body 156 has exhaust ports 166 and 168, as well as an output port 170 connected by the hydraulic line 20 to the working chamber 147 of the skid control actuator means 14 and a feedback port 172 connected to the output port 170. Advantageously, an orifice restriction 174 may be included in the region of the feedback port 172. Valve spool 160 is urged axially to the left through the action of a return spring 176 having a low spring rate. Pressurized hydraulic fluid is supplied through hydraulic line 38 to an input port 178 located in the valve body.

It should be noted that valve spool 160 has a large diameter portion 180 and a small diameter portion 182. The large diameter portion is separated from the small diameter portion by an open region 184 that is in communication with the feedback port 172. Hydraulic fluid which enters the valve through feedback port 172 applies a force to valve spool 160 urging it toward the left that is of a magnitude determined by the fluid pressure and the difference in areas of the faces of the large diameter portion 180 and the small diameter portion 182.

OPERATION OF THE PREFERRED EMBODIMENT

When the operator of the motor vehicle wishes to stop the vehicle, he depresses the brake pedal 110 (FIG. 3) which moves valve spool 106 axially to the right. This movement of the valve spool relative to the piston assembly 92 blocks the passage 132 to the exhaust port 98 and opens the passage from input port 96 to the open-center region 118 of the valve spool and permits flow from the open-center region 118 through passage 128 to the pressure chamber 130. The hydraulic fluid in pressure chamber 130 causes the piston assembly 92 to move axially to the right as viewed in FIG. 3.

The pressurized hydraulic fluid which enters the open-center region 118 of valve spool 106 acts upon the valve spool to produce a small axial force urging it toward the left. This small axial force is the result of the differential area between the large diameter portion 114 and the small diameter portion 116 of the valve spool 106. This small axial force is a reaction force which may be felt by the motor vehicle operator, and is preferably a force of approximately one-tenth of the total hydraulic force input to the dual master cylinder when the skid control system is not in operation. This force feedback exerted on the operator's foot by the servo mechanism provides a "feel," or a measure of the force with which the operator is applying the brake, allowing for more accurate and smoother operator control.

If there is a failure in the hydraulic power supply or some other part of the hydraulic system, the mechanical force originating with the vehicle operator is applied in series through valve spool 106 to piston assembly 92, when the end of projection 112 contacts the piston assembly, and through rod 84 to the dual master cylinder. Thus, mechanical force is applied to the dual master cylinder when a hydraulic failure occurs. If the skid control apparatus operates from the same source of hydraulic pressure, it will not interfere with the brake system when a hydraulic failure has occurred. This makes the system fail-safe.

The pressure acting on the piston assembly transmits a first axial force to rod 84 and to the floating beam 82. The force on the floating beam 82 is divided between and is transmitted through piston extensions 78 and 80 to the parallel piston assemblies of the dual master cylinder 10. With particular reference to FIG. 3, this first axial force acts upon the piston assembly 56 to move it axially to the right. Brake fluid intake port 64 becomes blocked, and the pressure of the brake fluid in pressure chamber 62 increases this brake fluid pressure being transmitted through port 72 and hydraulic lines 74 and 76 (FIG. 1) to the slave cylinders of the front and rear brakes. This causes the slave cylinders to actuate the brake mechanisms. Actuation of the brake mechanisms causes the respective wheel velocities to decrease and results in a certain amount of wheel slip, as previously defined.

If the amount of wheel slip at the rear wheels becomes excessive, the skid control computer 32 for the front brakes will supply an electrical input signal $V_1$, indicative of such wheel slip, to the coil 152 of the skid control valve means 22 for the front brakes. Likewise, if the slip of the rear wheels should become excessive, the skid control computer 28 for the rear brakes supplies an electrical input signal $V_2$ to the coil 152 of the skid control valve means 18 for the rear brakes.

The operation of the skid control valve means and skid control actuator means for the rear brakes is described below, the skid control apparatus for the front brakes operating in a similar manner.

The magnitude of the electrical input signal to coil 152 is indicative of wheel slip and, preferably is directly proportional to the percentage of wheel slip $S_2$ for the rear wheels of the motor vehicle. The current in coil 152 varies in accordance with the magnitude of the input signal from the skid control computer for the rear brakes. The force acting on solenoid plunger 158 urging it toward the right is directly proportional to this coil current and hence, is modulated or varies in accordance with the signal from the skid control computer. Valve spool 160 moves axially to the right as viewed in FIG. 1 against the force of return spring 176 to close exhaust port 166. In FIG. 1, valve spool 160 is shown at the position wherein exhaust port 166 has just been blocked. Prior to closure of this exhaust port, the working chamber 147 of the skid control actuator means 14 is connected to exhaust through hydraulic line 20. Further travel of valve spool 160 toward the right allows pressurized hydraulic fluid to enter the valve through input port 178 and to exit through output port 170. This pressurized hydraulic fluid flows through hydraulic line 20 to the working chamber 147 of the skid control actuator means 14 for the rear brakes. This hydraulic pressure in the working chamber acts upon the face of piston assembly 140 to provide a second axial force, oppositely directed to the first axial force, on piston assembly 56 in the dual master cylinder 10 (FIG. 2).

It should be noted that the piston assembly 140 of the skid control actuator means is larger in diameter than is the piston assembly 92 of the hydraulic servo assembly. Therefore, because the skid control actuator means and the hydraulic servo assembly are supplied with hydraulic fluid pressure from the same hydraulic power supply, the second axial force produced by the pressure acting on the skid control actuator piston 140 will always be sufficient to overcome the first axial force produced by the fluid acting on the piston assembly 92 of the hydraulic servo assembly. This means that, regardless of the pedal pressure applied by the motor vehicle operator which tends to lock the wheels, the skid control apparatus will be able to release the brakes and reduce the percentage wheel slip to a desired level.

With reference again to FIG. 1, the pressurized hydraulic fluid from output port 170 of the skid control valve means 18 is in fluid communication with the feedback port 172 through orifice restriction 174, the latter providing a damping effect within the feedback line to prevent undesirable effects of sudden pressure increases in the output line. The pressure of the hydraulic fluid which enters the open region 184 between the large diameter portion 180 and the small diameter portion 182 of valve spool 160 is substantially equal to the pressure in hydraulic line 20. However, the effect of this fluid pressure in the open region is to produce a force on valve spool 160 tending to urge it toward the left as viewed in FIG. 1. The magnitude of this feedback force depends upon the difference in area between the faces of the large diameter portion 180 and the small diameter portion 182 of the valve spool 160. Thus, the force transmitted to the valve spool from the solenoid valve plunger 158 urging the valve spool toward the right is partially offset by the feedback force acting upon the differential area urging the valve spool toward the left, together with the force produced by return spring 176 also urging the valve spool toward the left. The feedback force thus causes the valve spool to move toward the left for a certain distance to partially obstruct flow through the input port 178. When the valve spool is in equilibrium, there is a pressure drop in the hydraulic fluid between input port 178 and output port 170. The pressure level at the output port 170, less than the input pressure of the hydraulic fluid, determines the magnitude of the force which acts upon the piston of the skid control actuator means to oppose the applied braking pressure to the vehicle wheels.

When the skid control apparatus is in operation to provide a second axial force in opposition of the first axial force applied to the master cylinder pistons, the brake pedal must be displaced slightly in a direction opposite to that of the force applied to the brake pedal by the vehicle operator. This displacement signals to the operator that the skid control system is functioning.

Based upon the foregoing description of the invention and of the preferred embodiment thereof, what is claimed and desired to be protected by Letters Patent is:

1. In a vehicle braking system having a wheel brake actuated by a slave cylinder which responds to the application of fluid pressure to produce braking action, the brake system being supplied with a source of pressurized fluid and with an input signal indicative of excessive wheel slip, skid control braking apparatus which comprises:
   a. brake system master cylinder means, in fluid connection with the slave cylinder, for actuating the wheel brake through the application of fluid pressure to the slave cylinder, said master cylinder means having a piston axially movable therein;
   b. means for supplying a first axial force to one side of said master cylinder piston to direct pressurized brake fluid to the slave cylinder;
   c. skid control actuator means for applying a second axial force to the other side of said master cylinder piston in opposition to the first axial force thereon; and
   d. skid control valve means connected to said skid control actuator means for supplying thereto a variable pressure fluid output to produce the second axial force on said master cylinder piston, said skid control valve means comprising a valve body having an input port connected to the source of pressurized fluid and an output port connected to said skid control actuator means and a feedback port connected to the output port, a valve spool movable within said valve body, means responsive to the input signal indicative of excessive wheel slip for applying a force to said valve spool to move said valve spool in a direction to permit fluid flow from the input port to the output port, and means associated with said valve body and valve spool for applying fluid pressure to said valve spool through the feedback port to supply a force urging said valve spool toward a position to obstruct flow from the input port to the output port.

2. Vehicle braking system skid control apparatus in accordance with claim 1, wherein said skid control actuator means comprises a housing having an input port connected to the output port of said skid control valve means, a piston assembly movable within said housing and forming a working chamber therein, and means associated with said piston assembly for transmitting the force of means positioned to close one of the valves when the other valve is open; means to connect the valves to a source of fluid; signal responsive actuating means connected to the valves; first switching means on one side of the first spray device to deliver a signal to trigger the actuating means to direct fluid to the first spray device; and second switching means on the other side of the first spray device to deliver a signal to trigger the actuating means to direct fluid to the second spray device.

3. In a vehicle braking system having a wheel brake mechanism actuated by a slave cylinder which responds to the application of fluid pressure to produce such brake mechanism actuation, the brake system in operation being supplied with a source of pressurized fluid and with an electrical input signal indicative of excessive wheel slip, skid control apparatus which comprises:
   a. brake system master cylinder means, in fluid connection with the slave cylinder, for actuating the wheel brake through the application of fluid pressure to the slave cylinder, said master cylinder means having a piston axially movable therein;
   b. means for applying a first axial force to one side of said master cylinder piston to direct pressurized brake fluid to the slave cylinders;
   c. a skid control actuator for applying a second axial force to the other side of said master cylinder piston in opposition to the first axial force thereon, said skid control actuator comprising a housing having an input port therein, means for connecting said housing to said master cylinder means, a piston assembly movable within said housing and forming a working chamber therein, and means associated with said piston assembly for transmitting the force of pressurized fluid within said working chamber to the piston of said master cylinder means;
   d. a skid control valve having an output port connected to said skid control actuator input port for supplying pressurized fluid thereto and having an input port connected to the source of pressurized fluid and a feedback port fluidly connected with the output port, said skid control valve comprising a coil electrically connected to the electrical input signal indicative of excessive wheel slip, a solenoid plunger associated with said coil and responsive to the current in said coil to have exerted thereon a force proportional to the magnitude of the coil current, a valve body having an opening therein, and a valve spool movable within said valve body and connected with said solenoid plunger for movement in response to the force exerted thereon, said valve spool having a first position in the absence of current in said coil wherein flow of fluid from said input port to said output port is blocked, and said valve spool having a second position in which said input port is at least partially open for flow therefrom to said output port and wherein fluid pressure at the output port is fed back through the feedback port to said valve spool to produce a force thereon acting in opposition to the force of said solenoid plunger acting on said valve spool;
   whereby the pressurized fluid output from said skid control valve means acts through said skid control actuator means on the piston of said master cylinder means to reduce the fluid pressure applied to the slave cylinder in accordance with the magnitude of the electrical input signal indicative of excessive wheel slip.

4. In a vehicle braking system having a wheel brake mechanism actuated by a slave cylinder which responds to the application of fluid pressure to produce such brake mechanism actuation, the brake system in operation being supplied with a source of pressurized hydraulic fluid and with an electrical input signal indicative of excessive wheel slip, skid control apparatus which comprises:
   a. a brake system master cylinder means, in fluid connection with the slave cylinder, for actuating the wheel brake mechanism through the application of fluid pressure to the slave cylinder, said master cylinder means having a piston axially movable therein;

b. hydraulic servo assembly means for supplying the first axial force to the piston of said master cylinder means in response to actuation of said hydraulic servo assembly means by the operator of the vehicle;

c. skid control actuator means for applying a second axial force to the other side of said master cylinder piston in opposition to the first axial force; and d. skid control valve means hydraulically connected to said skid control actuator means for supplying thereto a variable pressure fluid output to produce the second axial force on said master cylinder piston, said skid control valve means being connected to the source of pressurized hydraulic fluid and being supplied with the electrical input signal indicative of excessive wheel slip, the pressure of the fluid output from said skid control valve means varying in accordance with the magnitude of the electrical input signal indicative of excessive wheel slip;

whereby the pressurized fluid output from said skid control valve means acts through said skid control actuator means on the piston of said master cylinder means to reduce the fluid pressure applied to the slave cylinder in accordance with the magnitude of the electrical input signal indicative of excessive wheel slip.

5. Braking system skid control apparatus in accordance with claim 4, wherein said skid control valve means comprises a valve body having a input port connected to the source of pressurized hydraulic fluid and an output port connected to said skid control actuator means and a feedback port hydraulically connected with the output port, a valve spool movable within said valve body, means responsive to the electrical input signal indicative of excessive wheel slip for applying a force to said valve spool proportional to the magnitude of the electrical input signal to move said valve spool in a direction to permit flow of hydraulic fluid from the input port to the output port, and means associated with said valve body and valve spool for applying hydraulic fluid pressure to said valve spool through the feedback port to supply a force urging said valve spool toward a position to obstruct flow of hydraulic fluid from the input port to the output port.

6. In a braking system for a motor vehicle having two front wheels and two rear wheels, each wheel having a brake mechanism actuated by a slave cylinder which responds to the application of fluid pressure to produce such actuation, the brake system in operation being supplied with a source of pressurized hydraulic fluid and with first and second electrical signals indicative of excessive slip of the front and rear wheels, respectively, skid control apparatus which comprises:

a. front brake master cylinder means, in fluid connection with the slave cylinders of the front brakes, for actuating the front brake mechanisms through the application of fluid pressure to the respective slave cylinders therefor, said master cylinder having a piston axially movable therein;

b. rear brake master cylinder means, in fluid connection with the slave cylinders of the rear brakes, for actuating the rear brake mechanisms through the application of fluid pressure to the respective slave cylinders therefor, said master cylinder means having a piston axially movable therein;

c. means for applying a first axial force to one side of the piston of said front brake master cylinder means to direct fluid pressure to the respective front brake slave cylinders;

d. front brake skid control actuator means for applying a second axial force to the other side of the piston of said front brake master cylinder means in opposition to the first axial force thereon;

e. means for applying a first axial force to one side of the piston of said rear brake master cylinder means to direct fluid pressure to the respective rear brake slave cylinders;

f. rear brake skid control actuator means for applying a second axial force to the other side of the piston of said rear brake master cylinder means in opposition to the first axial force thereon;

g. front brake skid control valve means connected to said front brake skid control actuator means for supplying thereto a variable pressure fluid output to produce the second axial force on the piston of said front brake master cylinder means, said front brake skid control valve means being connected to the source of pressurized fluid and being supplied with the first electrical input signal indicative of excessive front wheel slip, the pressure of the fluid output from said front brake skid control valve means varying in accordance with the magnitude of the first electrical input signal indicative of excessive front wheel slip; and h. rear brake skid control valve means connected to said rear brake skid control actuator means for supplying thereto a variable pressure fluid output to produce the second axial force on the piston of said rear brake master cylinder means, said rear brake skid control valve means being connected to the source of pressurized fluid and being supplied with the second electrical input signal indicative of excessive rear wheel slip, the pressure of the fluid output from said rear brake skid control valve means varying in accordance with the magnitude of the second electrical input signal indicative of excessive rear wheel slip.

7. Brake system skid control apparatus in accordance with claim 6, wherein said front brake master cylinder means and said rear brake master cylinder means are arranged in parallel to form a dual master cylinder; and wherein said means for applying a first axial force to one side of the piston of said front brake master cylinder means and said means for applying a first axial force to one side of the piston of said rear brake master cylinder means are collectively comprised of a floating beam, vehicle operator actuated means for applying a force to said floating beam, and means in engagement with said floating beam for proportioning the force applied thereto between one side of the piston of said front brake master cylinder means and one side of the piston of said rear brake master cylinder means.

8. Brake system skid control apparatus in accordance with claim 7, wherein said vehicle operator actuated means for applying a force to said floating beam comprises a hydraulic servo assembly adapted for connection to a source of hydraulic pressure, and means for transmitting the force produced by said hydraulic servo assembly to said floating beam.

* * * * *